(12) United States Patent
Gopalakrishnan (10) Patent No.: US 6,493,127 B2
(45) Date of Patent: Dec. 10, 2002

(54) MODULATION SYSTEMS USING DUAL CHANNEL OPTICAL MODULATORS

(75) Inventor: Ganesh K. Gopalakrishnan, Bethesda, MD (US)

(73) Assignee: Codeon Corporation, Columbia, MD (US)

( * ) Notice: Subject to any disclaimer, the term of this patent is extended or adjusted under 35 U.S.C. 154(b) by 70 days.

(21) Appl. No.: 09/757,494

(22) Filed: Jan. 11, 2001

(65) Prior Publication Data

US 2002/0089733 A1 Jul. 11, 2002

(51) Int. Cl.[7] .............................. G02F 1/03; G02F 1/035
(52) U.S. Cl. ....................... 359/254; 359/124; 359/245; 385/2; 385/40
(58) Field of Search ................................. 359/254, 245, 359/124; 385/2, 3, 40

(56) References Cited

U.S. PATENT DOCUMENTS

| | | | |
|---|---|---|---|
| 5,074,631 A | 12/1991 | Hamano et al. | ................ 385/3 |
| 5,303,079 A | 4/1994 | Gnauck et al. | ............. 359/188 |
| 5,408,544 A | 4/1995 | Seino | ............................. 385/3 |
| 5,787,211 A | 7/1998 | Gopalakrishnan | .............. 385/2 |
| 6,330,098 B1 * | 11/2001 | Gopalakrishnan | ........... 359/254 |

OTHER PUBLICATIONS

A. H. Gnauck et al., "Dispersion Penalty Reduction Using an Optical Modulator with Adjustable Chirp," IEEE Photonics Technology Letters, vol. 3, No. 10, Oct. 1991, pp. 916–918.

G. K. Gopalakrishnan et al., "Performance and Modeling of Broadband LiNbO$_3$ Traveling Wave Optical Intensity Modulators," Jour. Of Lightwave Technology, vol. 12, No. 10, Oct. 1994, pp. 1807–1819.

G. K. Gopalakrishnan et al., "Performance and Modeling of Resonantly Enhanced LiNbO$_3$ Modulators for Low–Loss Analog Fiber–Optic Links," IEEE Trans. On Microwave Theory and Techniques, vol. 42, No. 12, Dec. 1994, pp. 2650–2656.

P. Jiang et al. "LiNbO$_3$ Mach–Zehnder Modulators with Fixed Negative Chirp," IEEE Photonics Technology Letters, vol. 8, No. 10, Oct. 1996, pp. 1319–1321.

G. H. Smith et al., "Overcoming Chromatic–Dispersion Effects in Fiber–Wireless Systems Incorporating External Modulators," IEEE Trans. On Microwave Theory and Techniques, vol. 45, No. 8, Aug. 1997, pp. 1410–1415.

* cited by examiner

Primary Examiner—Georgia Epps
Assistant Examiner—Richard Hanig
(74) Attorney, Agent, or Firm—Morgan, Lewis & Bockius LLP (57) ABSTRACT

An optical modulation system for externally modulating two independent optical signals with first, second, third and fourth electrical input signals with two modulators. The system includes a first modulator with a first electrode receiving the first electrical input signal, a second electrode receiving the second electrical input signal, a first optical signal path co-propagating the first optical input signal with the first electrical signal and counter-propagating the second optical input signal to generate a first modulated optical signal, and a second optical signal path co-propagating the second optical input signal with the second electrical input signal and counter-propagating the first optical input signal to generate a second modulated optical signal. The second modulator includes a third electrode receiving the third electrical input signal, a fourth electrode receiving the fourth electrical input signal, a third optical signal path co-propagating the first optical input signal with the third electrical input signal and counter-propagating the second optical input signal to generate a third modulated optical signal, and a fourth optical signal path co-propagating the second optical input signal with the fourth electrical input signal and counter-propagating the first optical input signal to generate a fourth modulated optical signal.

55 Claims, 5 Drawing Sheets

MODULATION SYSTEMS USING DUAL CHANNEL OPTICAL MODULATORS

BACKGROUND OF THE INVENTION

1. Field of the Invention

The present invention relates to an optical modulator, and more particularly, to an external optical modulator. Although the present invention is suitable for a wide scope of application, it is particularly suitable for converting N number (wherein N is positive even integer greater than 2) of electrical signal channels into N/2 independent optical channels by using N/2 modulators.

2. Discussion of the Related Art

An external optical modulator (EOM) is an important component in wavelength division multiplexed (WDM) optical transmission systems. In such systems, an electrical signal representing the information to be transmitted is applied to the EOM, which then modulates a continuous wave (CW) laser beam that propagates the modulated light through the transmission system. One of the advantages of external optical modulation over directly modulating the laser is that data can be transmitted relatively chirp-free, thereby reducing errors in long distance transmission. Chirp is an instantaneous change in optical frequency, which accompanies the process of directly modulating the laser diode. Chirp interacts with the dispersion profile of the transmission fiber to severely limit the distance over which error-free data transmission is possible. External optical modulators can be designed with little or no chirp, enabling a much higher transmission distance than can be obtained with direct modulation.

In a conventional optical modulator, the dual electrode design concept was developed so that the data and its complement can be separately applied to the two electrodes of the dual electrode modulator. This is also known as differential driving. By adjusting the relative amplitudes of the data and its complement, the chirp parameter of the modulator can be fixed to any desired value between − and +.

Conventionally, externally modulated WDM transmission systems have employed one EOM for each electrical input signal. Further, the external optical modulator is one of the more expensive optical components employed in an optical system. It would therefore be advantageous to provide an apparatus wherein two or more electrical input signals are used to modulate two optical channels with one external optical modulator.

SUMMARY OF THE INVENTION

Accordingly, the present invention is directed to an external modulator that substantially obviates one or more of problems due to limitations and disadvantages of the related art.

Another object of the present invention is to provide an apparatus that modulates two optical channels with four independent subcarrier channels on two modulators and has four modulated optical output channels.

Another object of the present invention is to provide an apparatus that modulates three optical channels with six independent subcarrier channels on three modulators and has six modulated optical output channels.

A further object of the present invention is to provide an economically more feasible apparatus for modulating more than one optical channel in a single modulator.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, the present invention includes two Mach-Zehnder interferometer-type modulators for externally modulating two independent optical input signals with first, second, third and fourth electrical input signals, wherein a first modulator includes a first electrode receiving the first electrical input signal, a second electrode receiving the second electrical input signal, a first optical signal path co-propagating the first optical input signal with the first electrical signal and counter-propagating the second optical input signal to generate a first modulated optical signal, and a second optical signal path co-propagating the second optical input signal with the second electrical input signal and counter-propagating the first optical input signal to generate a second modulated optical signal, and wherein a second modulator includes a third electrode receiving the third electrical input signal, a fourth electrode receiving the fourth electrical input signal, a third optical signal path co-propagating the first optical input signal with the third electrical input signal and counter-propagating the second optical input signal to generate a third modulated optical signal, and a fourth optical signal path co-propagating the second optical input signal with the fourth electrical input signal and counter-propagating the first optical input signal to generate a fourth modulated optical signal.

In another aspect, the present invention includes three Mach-Zehnder interferometer-type modulators for externally modulating three independent optical input channels with first, second, third, fourth, fifth and sixth electrical input signals, wherein a first modulator includes a first electrode receiving the first electrical input signal, a second electrode receiving the second electrical input signal, a first optical signal path co-propagating the first optical input signal with the first electrical input signal and counter-propagating the second optical input signal to generate a first modulated optical signal, and a second optical signal path co-propagating the second optical input signal with the second electrical input signal and counter-propagating the first optical input signal to generate a second modulated optical signal, wherein a second modulator includes a third electrode receiving the third electrical input signal, a fourth electrode receiving the fourth electrical input signal, a third optical signal path co-propagating the third optical input signal with the third electrical input signal and counter-propagating the second optical input signal to generate a third modulated optical signal, and a fourth optical signal path co-propagating the second optical input signal with the fourth electrical input signal and counter-propagating the third optical input signal to generate a fourth modulated optical signal, and wherein a third modulator includes a fifth electrode receiving the fifth electrical input signal, a sixth electrode receiving the sixth electrical input signal, a fifth optical signal path co-propagating the third optical input signal with the fifth electrical input signal and counter-propagating the first optical input signal to generate a fifth modulated optical signal, and a sixth optical signal path co-propagating the first optical input signal with the sixth electrical input signal and counter-propagating the third optical input signal to generate a sixth modulated optical signal.

It is to be understood that both the foregoing general description and the following detailed description are exemplary and explanatory only and are not restrictive of the invention, as claimed.

BRIEF DESCRIPTION OF THE DRAWINGS

The accompanying drawings, which are included to provide a further understanding of the invention and are incorporated in and constitute a part of this application, illustrate several exemplary embodiments of the invention and together with the description, serve to explain the principle of the invention. In the drawings.

DETAILED DESCRIPTION OF THE PREFERRED EMBODIMENTS

Reference will now be made in detail to preferred embodiments of the invention, examples of which are illustrated in the accompanying drawings. Wherever possible, the same reference numbers will be used throughout the drawings to refer to the same or like parts.

Figure 1:
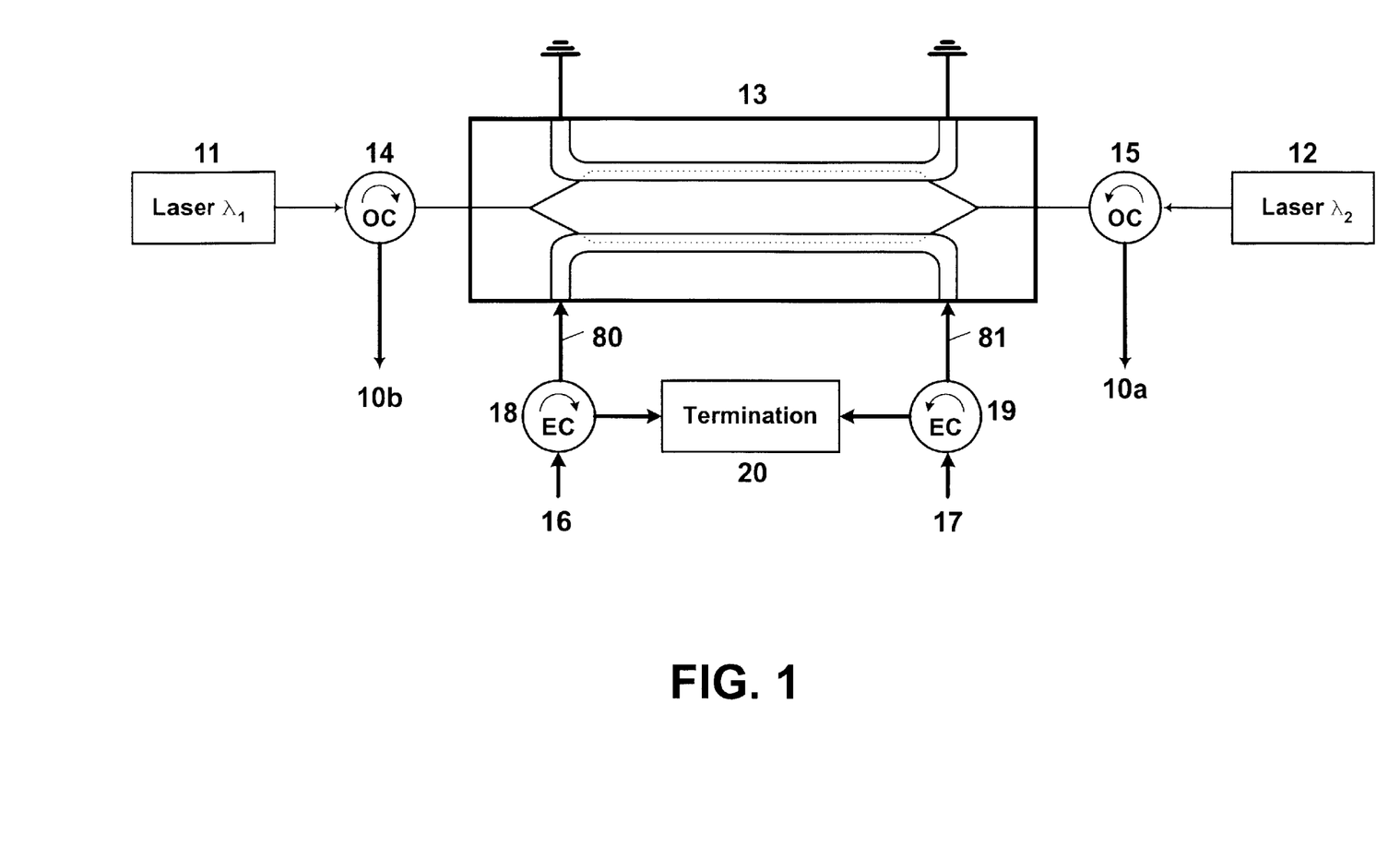
FIG. 1 is a schematic view of a modulating apparatus in accordance with a first exemplary embodiment of the present invention.

Initially referring to FIG. 1, which represents a microwave subcarrier-wavelength division multiplexed (SC-WDM) transmission system, a first exemplary embodiment of the present invention includes first and second lasers 11 and 12 generating lights of continuous wavelengths $\lambda_1$ and $\lambda_2$ that represent first and second optical channels and a Mach-Zehnder type modulator 13. A first optical circulator 14 is coupled between the first laser 11 and the Mach-Zehnder type modulator 13. A second optical circulator 15 is provided between the second laser 12 and the Mach-Zehnder type modulator 13. Also, first and second RF sources generating electrical signals that represent subcarrier channels 16 and 17 for modulating first and second optical channels $\lambda_1$ and $\lambda_2$ are provided to the Mach-Zehnder type modulator 13 on electrodes 80 and 81. Each of the subcarrier channels 16 and 17 may include one or more channels of electrical signals. A first electrical circulator 18 is coupled with the first subcarrier channels 16 and the first electrode 80 of the Mach-Zehnder type modulator 13. A second electrical circulator 19 is positioned between the second subcarrier channels 17 and second electrode 81 of the Mach-Zehnder type modulator 13. A terminating resistor 20 is provided between the first and second electrical circulators 18 and 19 for suppressing counter-propagating electrical signals with respect to the optical channels. Alternatively, separate terminating resistors may be attached to each of the first and second electrical circulators 18 and 19. A modulated first optical channel 10a is output from the second optical circulator 15 while a modulated second optical channel 10b is output from the first optical circulator 14. The first and second optical circulators 14 and 15 also provide optical isolation between the first and second optical channels 11 and 12.

Operation of the apparatus in accordance with the first exemplary embodiment is described as follows. In the Mach-Zehnder type modulator 13, the electrical signals from the subcarrier channels 16 and 17 to be transmitted are co-propagated with a continuous wave optical signal from the first and second lasers 11 and 12 to achieve an intensity modulation in the optical domain. In this mode of operation, if the electrical and optical signals are made to travel at nearly the same velocity, such as very high bandwidth ($\geq 40$ GHz) operation, data transmission is limited only by electrode loss of the device.

In contrast, if the electrical signals are made to counter-propagate with the optical signals, the electrical-optical interaction efficiency is degraded. Thus, significant nulls are introduced in the optical response as a function of frequency. Typically, at frequencies above about 2 GHz, the counter-propagating frequency response is about 15 to 40 dB below the co-propagating response. The frequency response and the magnitude and position of the nulls in the counter-propagating mode of operation are dependent on frequency and device design. Parameters relating to device design that affect the counter-propagating response of the modulator include the length of the device and the electrical effective index of the propagating electrical mode supported by the modulator.

With respect to FIG. 1, lasers 11 and 12 generate two independent uncorrelated laser sources which are applied to two optical ports (for example, input and output fibers and not shown in drawings) of the modulator 13. The first subcarrier channels 16, and the second subcarrier channels 17 are electrical input signals applied to the first and second electrical ports of modulator 13 for modulating optical wavelengths $\lambda_1$ and $\lambda_2$ respectively. The electrical signals may be coupled to the modulator using, for example, RF connectors. The optical circulators 14 and 15 separate out the optical channels 11 and 12 after modulation. However, in the alternative, a Wavelength Division Multiplexer ("WDM") can be used instead of an optical circulator to achieve the same function. The electrical circulators 18 and 19 provide electrical isolation between the first and second subcarrier channels 16 and 17 by directing the counter-propagating electrical subcarrier channels to the terminating resistor 20. Alternatively, other electrical isolators/resistors may be employed in place of the electrical circulators to accomplish the same function.

The first subcarrier channels 16 for modulation on $\lambda_1$ counter-propagates with the optical wavelength $\lambda_2$. Hence, it weakly interacts with $\lambda_2$. Similarly, since the second subcarrier channels 17 for modulation on $\lambda_2$ counter-propagates with the optical wavelength $\lambda_1$, it weakly interacts with $\lambda_1$. By judicious choice of subcarrier frequencies, significant suppression of cross-interference of $\lambda_1$ subcarrier channel with $\lambda_2$, and vice-versa can be obtained. For example, the subcarrier frequencies may be in the range above 2 GHz for some equipment. Once a modulator is designed and fabricated, the frequency response can be measured for the cases of: (1) co-propagating electrical and optical signals, and (2) counter-propagating electrical and optical signals. The counter-propagating response will typically contain several nulls as a function of frequency. By choosing the frequency of the subcarrier to correspond to a null position in the counter-propagating response, the interaction of this subcarrier channel with the counter-propagating optical channel is suppressed. The degree of suppression achievable is reflected by the measured counter-propagating response of the modulator. Interaction suppression in the range of 15–40 dB is possible in practice.

Figure 2:
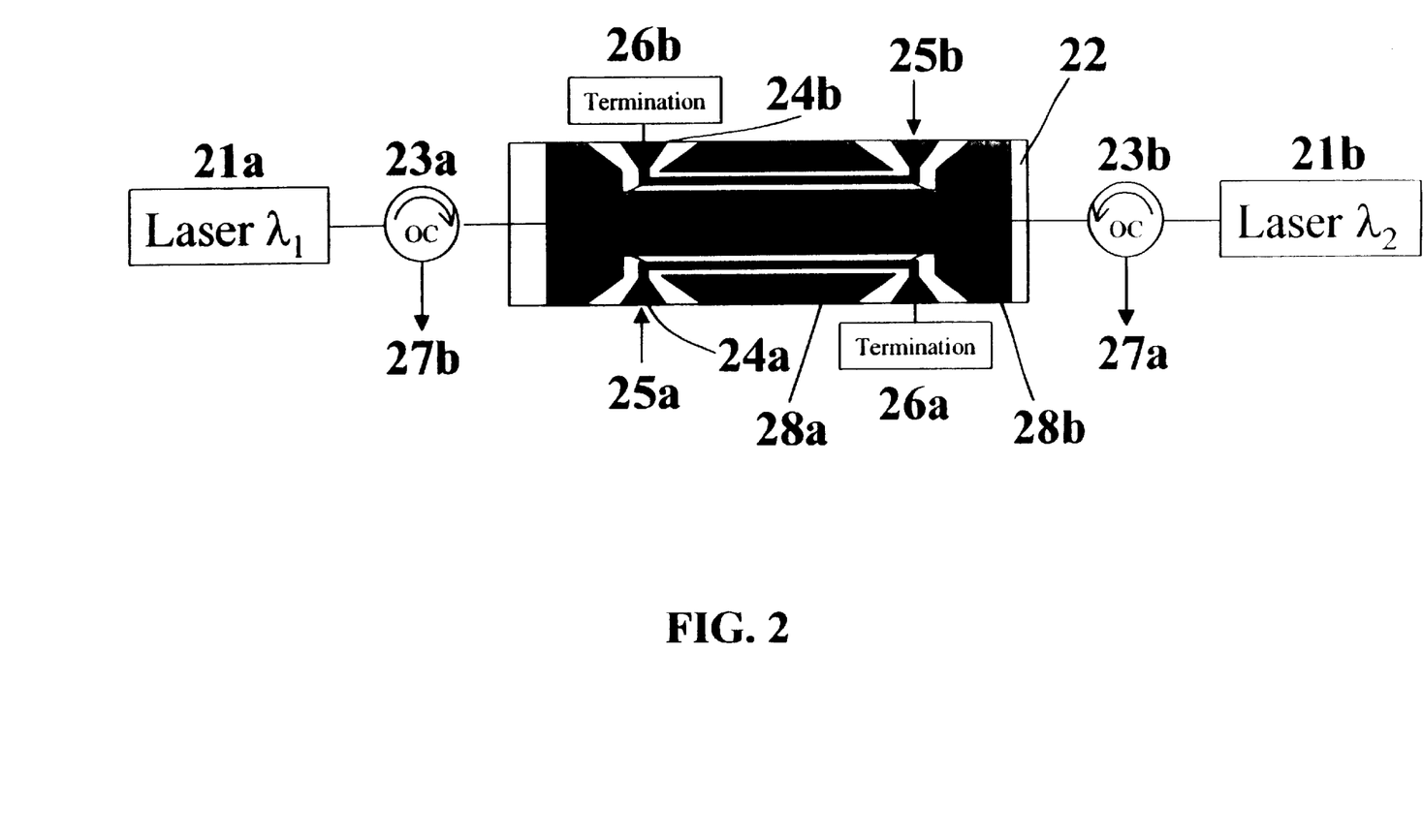
FIG. 2 is a schematic view of a modulating apparatus in accordance with a second exemplary embodiment of the present invention.

Alternately, electrical isolation between the two subcarrier channels can be obtained with the modulator design of the second exemplary embodiment of the present invention, as shown in FIG. 2. In this exemplary embodiment, two independent electrodes 24a and 24b are formed on a Mach-Zehnder type modulator 22 and separated from each other. In conventional dual electrode designs, the electrical and optical signals always co-propagate with each other. Thus, the two electrical driving signals are applied such that they propagate in the same direction as the single optical signal. Therefore, terminating resistors are placed at the end of the each electrode to be positioned diametrically opposite to each other.

In contrast to conventional designs, in the second embodiment of the present invention shown in FIG. 2, terminating resistors 26a and 26b are placed diagonally opposite to each other. The implementation of two independent optical channels modulated with one modulator is shown in FIG. 2.

Referring to FIG. 2, the second exemplary embodiment of the present invention includes first and second lasers 21a and 21b that produce continuous lights of different wavelengths $\lambda_1$ and $\lambda_2$ for first and second optical channels and a Mach-Zehnder type modulator 22. A first optical circulator 23a is disposed between the first laser 21a and the Mach-Zehnder type modulator 22. A second optical circulator 23b is disposed between the second laser 21b and the Mach-Zehnder type modulator 22. However, in the alternative, a Wavelength Division Multiplexer ("WDM) can be used instead of an optical circulator to achieve the same function. A modulated first optical channel 27a is output from the second optical circulator 23b while a modulated second optical channel 27b is output from the first optical circulator 23a. The first and second optical circulators 23a and 23b also provide optical isolation between the first and second optical channels 21a and 21b. First and second electrical signals 25a and 25b, typically RF signals, are applied to modulate the first and second optical channels. Unlike the first exemplary embodiment, electrical circulators (or electrical isolators) are not required in the second exemplary embodiment as shown in FIG. 2. A dual electrode 24a and 24b is formed on the Mach-Zehnder modulator 22 and separated from each other. One end of each electrode 24a/24b is connected to a terminating resistor 26a/26b while the other end of each electrode 24a/24b receives one of the first and second electrical signals 25a/25b. Dark areas 28a and 28b other than the dual electrode 24a/24b form ground electrodes.

As shown in FIG. 2, a first subcarrier signal 25a for modulation on optical signal $\lambda_1$ counter-propagate with optical signal $\lambda_2$, so that it interacts weakly with $\lambda_2$. For example, interaction may be limited to the range of 15–40 dB. Of course, the level of interaction acceptable depends on the particular application. Similarly, a second subcarrier channel 25b for modulation on optical signal $\lambda_2$ counter-propagate with optical signal $\lambda_1$, so that it interacts weakly with $\lambda_1$. By judicious choice of the subcarrier frequencies, cross-interference of $\lambda_1$ subcarrier channel with $\lambda_2$, and vice-versa are significantly reduced.

In this second exemplary embodiment, since the two driving electrodes 25a and 25b are separate and independent from each other, electrical isolation between the two groups of subcarrier channels is intrinsic. Thus, the electrical circulators shown in the first exemplary embodiment of FIG. 1 are not required.

Conventionally, the dual electrode designs were only to allow for the modulation of one optical channel on each modulator. Thus, even though the two electrodes were driven with independent drivers, the data applied to these electrodes was derived from the same data stream. Unlike the conventional dual electrode design, there are two optical channels on one modulator as shown in FIG. 2, so that the data to be transmitted maybe derived from two independent data streams.

Figure 3:
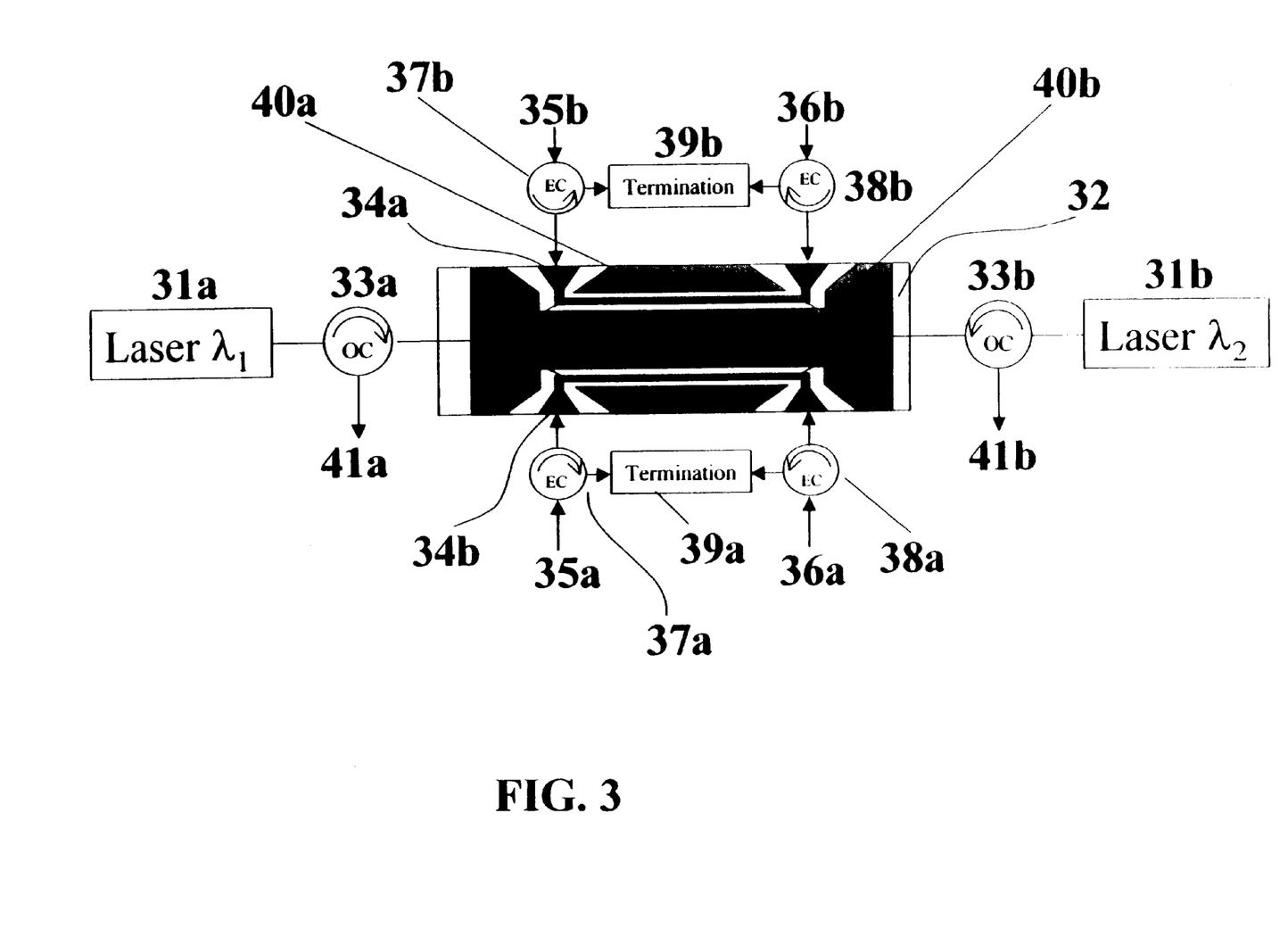
FIG. 3 is schematic view of a modulating apparatus in accordance with a third exemplary embodiment of the present invention.

In FIG. 3, a third exemplary embodiment of two optical channels on one differentially driven modulator with adjustable chirp is demonstrated. The third exemplary embodiment of the present invention includes first and second continuous wave lasers 31a and 31b that generate laser light having wavelengths $\lambda_1$ and $\lambda_2$ for two optical channels and a Mach-Zehnder type modulator 32. First and second optical circulators 33a and 33b are disposed between the first laser 31a and the Mach-Zehnder type modulator 32 and the second laser 31b and the Mach-Zehnder type modulator 32, respectively.

Subcarrier channels 35a and 35b are applied to electrical circulators 37a and 37b, respectively. Subcarrier channels 36a and 36b are applied to electrical circulators 38a and 38b, respectively. Subcarrier channel 35a may be derived from the same source as subcarrier channel 35b with a broad-band shifter to achieve a $\pm\pi/2$ phase difference between subcarrier channels 35a and 35b. Likewise, subcarrier channel 36a may be derived from the same source as subcarrier channel 36b with a broad-band shifter to achieve a $\pm\pi/2$ phase difference between subcarrier channels 36a and 36b. The $\pi/2$ phase shift could be employed to obtain unique modulation formats such as sideband or suppressed carrier modulation. In this case, the bias angle of the Mach-Zehnder modulators determines the kind of modulation obtained. Prior to the application of the subcarrier channels to the electrical circulators, an amplitude weighting factor is applied to each of the subcarrier channels 35a, 35b, 36a, and 36b. The amplitude weighting factor determines a chirp parameter of the particular optical wavelength channel.

The amplitude weighting factor of the subcarrier channels for modulation on $\lambda_1$ may be designated as $\alpha$ and $1-\alpha$, and the amplitude weighting factor of the subcarrier channels for modulation on $\lambda_2$ may be designated as $\beta$ and $1-\beta$, where $0\leq|\alpha|\leq1$ and $0\leq|\beta|\leq1$. Specifically, subcarrier signals 35a and 35b for modulation on $\lambda_1$ have amplitude weighing factors of $\alpha$ and $(1-\alpha)$, respectively. As noted above, subcarrier signals 35a and 35b may be derived from the same source, e.g., the same data stream. Thus, their weighted complements are $\alpha\times$(subcarrier signal) and $(1-\alpha)\times$(subcarrier signal). Similarly, subcarrier signals 36a and 36b for modulation on having amplitude weighing factors of $\beta$ and $(1-\beta)$ are also derived from a common source (e.g., the same data stream), which may be different from the source intended for modulation on $\lambda_1$.

For example, when $\alpha$ and $\alpha$ are 0.5, complementary signals of equal amplitude are applied to each electrode 34a and 34b of the modulator 32. This condition corresponds to differential driving with near zero chirp. By varying the values of $\alpha$ and $\beta$, different chirp parameters can be obtained.

The amplitude weighting factors may be implemented, for example, by adjusting the amplitudes of the subcarrier channels 35a and 35b and the subearrier channels 36a and 36b. Alternatively or in addition, an electrical splitter may be used to implement the amplitude weighing factors. For example, an electrical splitter may split an electrical signal into subcarrier channels 35a and subcarrier channels 35b, with the split ratio of the splitter determining the weighting factor. Then the subcarrier channel 35b may be phase shifted with respect to subcarrier channel 35a, as discussed above.

Similar to the previous exemplary embodiments, the optical circulators 33a and 33b separate out the optical channels 41a and 41b after modulation. Dark areas 40a and 40b other than the dual electrode 34a/34b form ground electrodes. Also, electrical circulators 37a, 37b, 38a, and 38b respectively provide the necessary isolation between subcarrier signals 35a and 35b for modulation on the first optical signal $\lambda_1$, and subcarrier signals 36a and 36b for modulation on the second optical signal $\lambda_2$. Between the electrical circulators 37a and 38a, a terminating resistor 39a is commonly connected to suppress counter-propagating electrical signals with respect to the optical signals. Similarly, another terminating resistor 39b is positioned between the electrical circulators 37b and 38b to suppress counter-propagating electrical signals with respect to the optical signals. Separate terminating resistors may be coupled to each of electrical circulators 37a and 37b and/or electrical circulators 38a and 38b. Alternatively, other electrical isolators may be employed in place of the electrical circulators/resistors to accomplish the same function.

As previously described, one of the advantages of the present invention is that two independent optical channels are modulated in one modulator and can be implemented in WDM transmission systems to reduce the number of modulators needed to convert electrical channels of data into optical channels of data. The fourth exemplary embodiment illustrated in FIG. 4 converts four independent subcarrier channels of electrical signals into modulated optical channels using two lasers, a pair of optical circulators and a pair of the previously described modulators shown in FIG. 1. With respect to FIG. 4, lasers 11 and 12, which are located on each side of the modulators 131 and 132, are independent uncorrelated continuous wave sources which are each split and applied to one of two optical ports (for example, using a beam splitter and optical fibers connected to the modulators) on the sides of the modulators 131 and 132.

Figure 4:
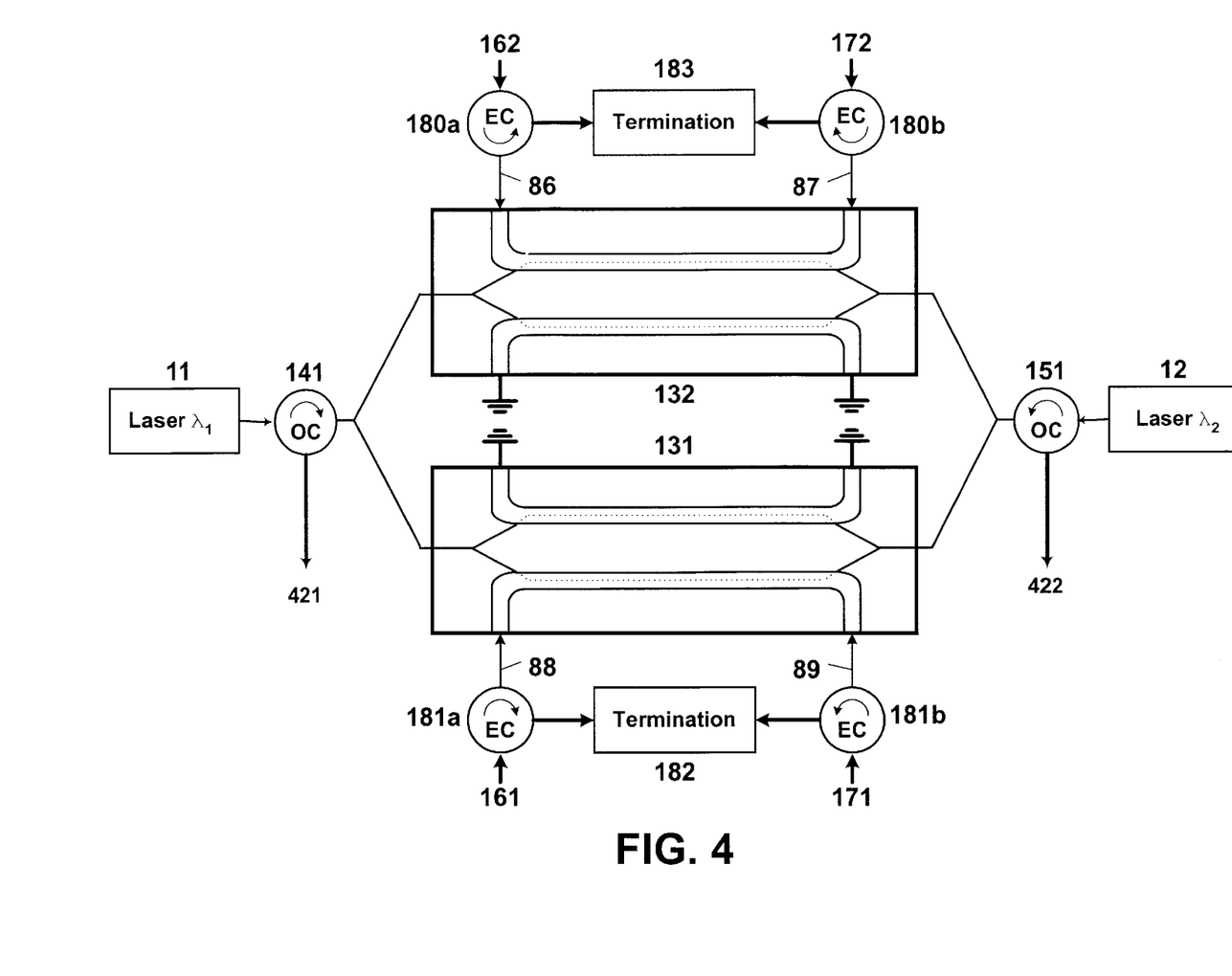
FIG. 4 is a schematic view of a modulating apparatus in accordance with a fourth exemplary embodiment of the present invention.

The first optical channel signal 11 and second optical channel signal 12 are generated by separate continuous wave mode lasers having distinctive wavelengths of $\lambda_1$ and $\lambda_2$. The first and third subcarrier channels are electrical input signals applied to the first electrical ports 161/162 of modulators 131 and 132 for modulating optical wavelength $\lambda_1$. The second and the fourth subcarrier channels are electrical input signals applied to the second electrical ports 171/172 of modulators 131 and 132 for modulating optical wavelength $\lambda_2$. The electrical input signals may be coupled to the electrodes 86/87/88/89 of the modulator using, for example, RF connectors. The first, second, third and fourth electrical input signals are from different data sources with frequencies above 2 Ghz.

The optical circulators 141 and 151, which are each located between a splitter and a laser, separate out the modulated optical channels of lasers 11 and 12 as outputs 421 and 422, respectively. The electrical circulators 180a/181a and 180b/181b provide electrical isolation between the first/third 161/162 and second/fourth 171/172 subcarrier channels by directing the counter-propagating electrical subcarrier channels into the terminating resistors 182/183. Typically, such a system in the prior art would require the use of four modulators, as well as, four lasers. The overall effect of branch connecting the two interferometer modulators 131/132 is that the device becomes an interferometer with two interferometers modulators inside.

Alternatively, electrical isolation between the two subcarrier channels 161 and 171 on the first modulator 131, or the two subcarrier channels 162 and 172 on the second modulator 132 can be obtained by using at least one or more of the modulators describe in the second exemplary embodiment of the present invention with regard to FIG. 2. Another alternative is that electrical isolation between the two subcarrier channels 161 and 171 on the first modulator 131, or the two subcarrier channels 162 and 172 on the second modulator can be obtained, as well as, the chirp being adjustable for each of the modulators, by using at least one or more of the modulators describe in the third exemplary embodiment of the present invention with regard to FIG. 3.

Figure 5:
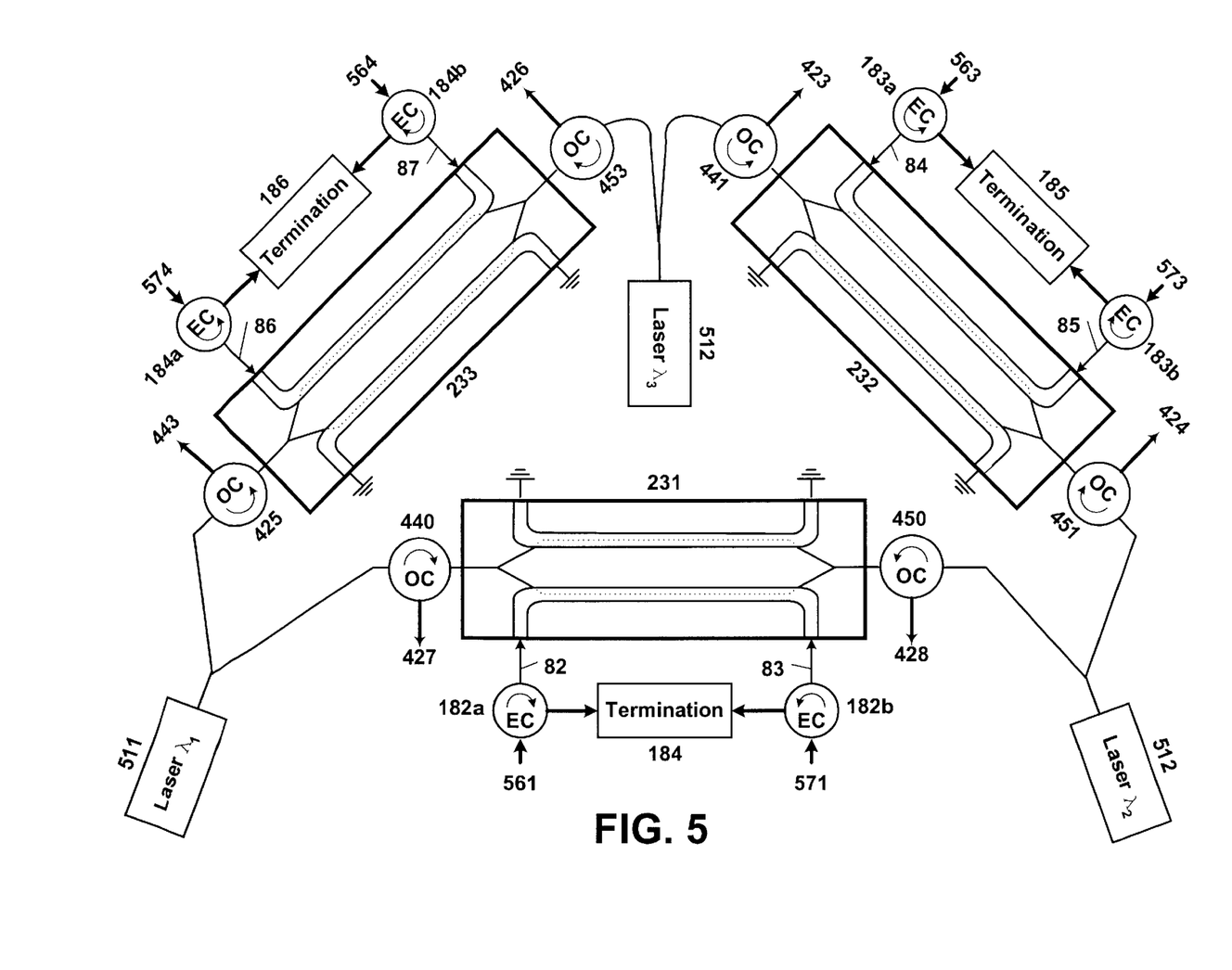
FIG. 5 is schematic view of a modulating apparatus in accordance with a fifth exemplary embodiment of the present invention.

The fifth exemplary embodiment, as shown in FIG. 5, illustrates the use of dual channel modulators for converting six independent subcarrier channels into three modulated optical channels. FIG. 5 shows a ring of three Mach-Zehnder interferometer-type modulators 231/232/233 that modulate three independent optical channels 511/512/513 with first, second, third, fourth, fifth and sixth electrical input signals. The first modulator 231 includes a first electrical port 561 receiving the first electrical input signal, a second electrical port 571 receiving the second electrical input signal, a first optical signal path co-propagating the first optical input signal 511 with the first electrical input signal and counter-propagating the second optical input signal 512 to generate a first modulated optical signal 428 corresponding to the first optical input 511 signal modulated with the first electrical input signal, a second optical signal path co-propagating the second optical input signal 512 with the second electrical input signal and counter-propagating the first optical input signal 511 to generate a second modulated optical signal 427 corresponding to the second optical input signal 512 modulated with the second electrical input signal. The second modulator 232 includes a first electrical port 563 receiving the third electrical input signal, a second electrical port 573 receiving the fourth electrical input signal, a third optical signal path co-propagating the third optical input signal 513 with the third electrical input signal and counter-propagating the second optical input signal 512 to generate a third modulated optical signal 424 corresponding to the third optical input signal 513 modulated with the third electrical input signal, and a fourth optical signal path co-propagating the second optical input signal 512 with the fourth electrical input signal and counter-propagating the third optical input signal 513 to generate a fourth modulated optical signal 423 corresponding to the second optical input signal 512 modulated with the fourth electrical input signal. The third modulator 233 includes a first electrical port 564 receiving the fifth electrical input signal, a second electrical port 574 receiving the sixth electrical input signal, a fifth optical signal path co-propagating the third optical input signal 513 with the fifth electrical input signal and counter-propagating the first optical input signal 511 to generate a fifth modulated optical signal 425 corresponding to the third optical input signal 513 modulated with the fifth electrical input signal, and a sixth optical signal path co-propagating the first optical input signal 511 with the sixth electrical input signal and counter-propagating the third optical input signal 513 to generate a sixth modulated optical signal 426 corresponding to the first optical input signal 511 modulated with the sixth electrical input signal.

The first 511, second 512 and third 513 optical signals are generated by separate continuous wave mode lasers having distinctive wavelengths of $\lambda_1$, $\lambda_2$ and $\lambda_3$. The first, third and fifth subcarrier channels are electrical input signals applied to the first electrical ports 561/563/564 of modulators 231, 232 and 233 for respectively modulating the optical wavelengths of $\lambda_1$, $\lambda_3$ and $\lambda_3$. The second, fourth and sixth subcarrier channels are electrical input signals applied to the second electrical ports 571/573/574 of modulators 231, 232 and 233 for respectively modulating the optical wavelengths of $\lambda_2$, $\lambda_2$ and $\lambda_1$. The electrical input signals may be coupled to the electrodes 82/83/84/84/86/87 of the modulator using, for example, RF connectors. The first, second, third, fourth, fifth and sixth electrical input signals are from different data sources with frequencies above 2 Ghz.

The optical circulators 440 and 450, that are each located between a splitter and the first modulator 231, separate out the modulated optical channels of lasers 512 and 511 as outputs 427 and 428, respectively. The optical circulators 441 and 451, which are each located between a splitter and the second modulator 232, separate out the modulated optical channels of lasers 512 and 513 as outputs 423 and 424, respectively. The optical circulators 443 and 453, which are each located between a splitter and the third modulator 233, separate out the modulated optical channels of lasers 513 and 511 as outputs 443 and 453, respectively. The electrical circulators 182a/183a/184a and 182b/183b/184b provide electrical isolation between the first/third/fifth 427/563/574 and second/fourth/sixth 571/573/564 subcarriers channels by directing the counter-propagating electrical subcarrier channels into the terminating resistors 184/185/186.

Alternatively, electrical isolation between the two subcarrier channels 561 and 571 on the first modulator 231, the two subcarrier channels 563 and 573 on the second modulator 232 and/or the two subcarrier channels 574 and 564 on the third modulator 233 can be obtained by using at least one of the modulators described in the second exemplary embodiment of the present invention with regard to FIG. 2. Another alternative is that electrical isolation between the two subcarrier channels 561 and 571 on the first modulator 231, the two subcarrier channels 563 and 573 on the second modulator 232 and/or the two subcarrier channels 574 and 564 on the third modulator 233 can be obtained by using at least modulator of the third exemplary embodiment of the present invention as described with regard to FIG. 3.

A ring of four, five or more modulators can also be made using the above concepts of the present invention. However, a system having two sets of the fourth exemplary embodiment, as shown in FIG. 4, is preferable to a ring of four modulators because fewer optical circulators are required to implement a such a system (i.e. four optical circulators instead of eight). The same is true for a system having a set of modulators in accordance with the fourth exemplary embodiment of the present invention and a set of modulators in accordance with the fifth exemplary embodiment of the present invention as opposed to a ring of five modulators (i.e. eight modulators instead of ten).

FIG. 4 and FIG. 5 respectively illustrate exemplary optical modulation devices for four and six electrical subcarrier channels systems. An eight electrical subcarrier channel system would merely be a system comprised of two of the devices describe with regard to FIG. 4. A ten subcarrier channel system would be a system requiring one of each of the devices as described with regard to in FIGS. 4 and 5. A twelve subcarrier channel system can either use three devices, as described with regard to FIG. 4 or two of the devices as described with regard to FIG. 5. However, a system of three devices, as described with regard to FIG. 4, would require half as many optical circulators as opposed to a system of two of the devices, as described with regard to FIG. 5. Of course, other multiples or combinations of the devices described herein can be used in an optical system for converting electrical channels into modulated optical channels.

It will be apparent to those skilled in the art that various modification and variations can be made in the apparatus of the present invention without departing from the scope or spirit of the inventions. Thus, it is intended that the present invention covers the modifications and variations of this invention provided they come within the scope of the appended claims and their equivalents.

What is claimed is:

1. An optical device with two optical input channels and four modulated output channels comprising:
   a first optical modulator;
   a second optical modulator;
   a first electrode receiving a first electrical input signal;
   a second electrode receiving a second electrical input signal;
   a first optical input signal;
   a second optical input signal;
   a first optical signal path co-propagating the first optical input signal with the first electrical input signal and counter-propagating the second optical input signal to generate a first modulated optical signal;
   a second optical signal path co-propagating the second optical input signal with the second electrical input signal and counter-propagating the first optical input signal to generate a second modulated optical signal;
   a third electrode receiving a third electrical input signal;
   a fourth electrode receiving a fourth electrical input signal;
   a third optical signal path co-propagating the first optical input signal with the third electrical input signal and counter-propagating the second optical input signal to generate a third modulated optical signal; and
   a fourth optical signal path co-propagating the second optical input signal with the fourth electrical input signal and counter-propagating the second optical input signal to generate a fourth modulated optical signal.

2. The optical device according to claim 1, further comprising:
   a first laser, coupled to the first and third optical signal paths, for generating the first optical input signal; and
   a second laser, coupled to the second and fourth optical signal paths, for generating the second optical input signal.

3. The optical device according to claim 2, further comprising:
   a first optical circulator between the first laser and the first optical signal path for providing optical isolation between the first laser and the second and fourth modulated optical signals, and
   a second optical circulator between the second laser and the second optical signal paths for providing optical isolation between the second laser and the first and third modulated optical signals.

4. The optical device according to claim 1, further comprising:
   a first wavelength division multiplexer between the first laser and the first optical signal path for providing optical isolation between the first laser and the second and fourth modulated optical signals; and
   a second wavelength division multiplexer between the second laser and the second optical signal paths for providing optical isolation between the second laser and the first and third modulated optical signals.

5. The optical device according to claim 1, further comprising:

first and third electrical circulators respectively coupled to the first and third electrodes; second and fourth electrical circulators respectively coupled to the second and fourth electrodes; and wherein the first and second electrical circulators provide electrical isolation for the first and second electrical input signals, and the third and fourth electrical circulators provide electrical isolation for the third and fourth electrical input signals.

6. The optical device according to claim 5, further comprising terminating resistors coupled to each of the first, second, third and fourth electrical circulators for suppressing counter-propagating electrical input signals with respect to the first and second optical signals.

7. The optical device according to claim 1, further comprising:

first and third electrical isolators respectively coupled to the first and third electrodes;

second and fourth electrical isolators respectively coupled to the second and fourth electrodes; and wherein the first and second electrical isolators provide electrical isolation for the first and second electrical input signals, and the third and fourth electrical isolators provide electrical isolation for the third and fourth electrical input signals.

8. The optical device according to claim 1, wherein the first, second, third and fourth electrical input signals are from different data sources with frequencies above 2 GHz.

9. The optical device according to claim 1, wherein each of the first and second optical input signals are generated by separate continuous wave mode lasers.

10. The optical device according to claim 1, wherein said modulators are Mach-Zehnder interferometer-type optical modulators.

11. The optical device according to claim 1, wherein at least one of said first and second optical modulators comprise:

an electrode receiving an electrical signal;

another electrode receiving another electrical signal;

a terminating resistor coupled to an end of the electrode; and another terminating resistor coupled to an end of the other electrode, wherein the terminating resistors are disposed diagonally to each other on the modulator.

12. The optical device according to claim 1, wherein at least one of said first and second modulators comprise:

an electrode having first and second ends, the first end receiving a first electrical signal for propagation in a first direction and the second end receiving a second electrical signal for propagation in a second direction opposite to the first direction;

another electrode substantially isolated from the electrode and having first and second ends, the first end receiving a third electrical signal for propagation in a third direction and the second end receiving a fourth electrical signal for propagation in a fourth direction opposite to the third direction.

13. The optical device according to claim 12, wherein the first direction and the third direction are the same and the second direction and the fourth direction are the same.

14. The optical device according to claim 12, wherein the first electrical signal is the complement of the third electrical signal, and the second and fourth electrical signals are complementary.

15. The optical device according to claim 12, wherein the first electrical signal corresponds to the first electrical input signal multiplied by a weighting factor of $\alpha$ and the third electrical signal corresponds to the first electrical input signal multiplied by a weighing factor of 1-$\alpha$, where $0 \leq |\alpha| \leq 1$; and the second electrical signal corresponds to the second electrical input signal multiplied by a weighting factor of $\beta$ and the fourth electrical signal corresponds to the second electrical input signal multiplied by a weighting factor of 1-$\beta$, where $0 \leq |\beta| \leq 1$.

16. The optical device according to claim 12, wherein the first electrical signal corresponds to the third electrical input signal multiplied by a weighting factor of $\alpha$ and the third electrical signal corresponds to the third electrical input signal multiplied by a weighing factor of 1-$\alpha$, where $0 \leq |\alpha| \leq 1$; and the second electrical signal corresponds to the fourth electrical input signal multiplied by a weighting factor of $\beta$ and the fourth electrical signal corresponds to the fourth electrical input signal multiplied by a weighting factor of 1-$\beta$, where $0 \leq |\beta| \leq 1$.

17. The optical device of claim 12, further comprising:

a first electrical circulator coupled to the first end of the electrode;

a second electrical circulator coupled to the second end of the electrode;

a third electrical circulator coupled to the first end of the other electrode; and a fourth electrical circulator coupled to the second end of the other electrode.

18. The optical device of claim 17, further comprising:

first and second terminating resistors coupled to the first and second electrical circulators; and third and fourth terminating resistors coupled to the third and fourth electrical circulators.

19. A wavelength division multiplexed optical transmission apparatus for externally modulating two optical signals with electrical input signals comprising:

a first optical modulator;

a second optical modulator;

a first electrode receiving a first electrical input signal;

a second electrode receiving a second electrical input signal;

a third electrode receiving a third electrical input signal;

a fourth electrode receiving a fourth electrical input signal;

a first optical signal path co-propagating the first optical signal with the first electrical input signal and counter-propagating the first optical signal with the second electrical input signal, to generate a first modulated optical signal corresponding to the first optical signal modulated with the first electrical input signal;

a second optical signal path co-propagating the second optical signal with the second electrical input signal and counter-propagating the second optical signal with the first electrical input signal, to generate a second modulated optical signal corresponding to the second optical signal modulated with the second electrical input signal;

a third optical signal path co-propagating the first optical signal with the third electrical input signal and counter-propagating the first optical signal with the fourth electrical input signal, to generate a third modulated optical signal corresponding to the first optical signal modulated with the third electrical input signal; and a fourth optical signal path co-propagating the second optical signal with the fourth electrical input signal and counter-propagating the second optical signal with the third electrical input signal, to generate a fourth modulated optical signal corresponding to the second optical signal modulated with the fourth electrical input signal.

20. The apparatus according to claim 19, further comprising:
   a first laser, coupled to the first and third optical signal paths, for generating the first optical signal; and
   a second laser, coupled to the second and fourth optical signal paths, for generating the second optical signal.

21. The apparatus according to claim 20, further comprising:
   a first optical circulator between the first laser and the first and third optical signal paths for providing optical isolation between the first laser, and the second and fourth modulated optical signals; and
   a second optical circulator between the second laser and the second and fourth optical signal paths for providing optical isolation between the second laser, and the first and third modulated optical signals.

22. The apparatus according to claim 20, further comprising:
   a first wavelength division multiplexer between the first laser and the first and third optical signal paths for providing optical isolation between the first laser, and the second and fourth modulated optical signals; and
   a second wavelength division multiplexer between the second laser and the second and fourth optical signal paths for providing optical isolation between the second laser, and the first and third modulated optical signals.

23. The apparatus according to claim 19, further comprising:
   a first electrical circulator coupled to the first electrode and a second electrical circulator coupled to the second electrode, wherein the first and second electrical circulators provide electrical isolation for the first and second electrical input signals; and
   a third electrical circulator coupled to the third electrode and a fourth electrical circulator coupled to the fourth electrode, wherein the third and fourth electrical circulators provide electrical isolation for the third and fourth electrical input signals.

24. The apparatus according to claim 19, further comprising:
   a first electrical isolator coupled to the first electrode and a second electrical isolator coupled to the second electrode, wherein the first and second electrical isolators provide electrical isolation for the first and second electrical input signals; and
   a third electrical isolator coupled to the third electrode and a fourth electrical isolator coupled to the fourth electrode, wherein the third and fourth electrical isolators provide electrical isolation for the third and fourth electrical input signals.

25. The apparatus according to claim 19, wherein the first optical signal and the second electrical input signal weakly interact with each other;
   the second optical signal and the first electrical input signal weakly interact with each other;
   the second optical signal and the third electrical input signal weakly interact with each other; and
   the first optical signal and the fourth electrical input signal weakly interact with each other.

26. The apparatus according to claim 19, wherein the first, second, third and fourth electrical input signals have frequencies above 2 GHz.

27. The apparatus according to claim 23, further comprising terminating resistors coupled to each of the first, second, third and fourth electrical circulators for suppressing counter-propagating electrical input signals.

28. The apparatus according to claim 19, wherein each of the first and second optical signals are generated by separate continuous wave mode lasers.

29. The apparatus according to claim 19, wherein said optical modulators are a Mach-Zehnder interferometer-type modulator.

30. The apparatus according to claim 19, wherein at least one of said first and second optical modulators comprise:
   an electrode having first and second ends, the first end receiving a first electrical signal for propagation in a first direction and the second end receiving a second electrical signal for propagation in a second direction opposite to the first direction;
   another electrode substantially isolated from the electrode and having first and second ends, the first end receiving a third electrical signal for propagation in a third direction and the second end receiving a fourth electrical signal for propagation in a fourth direction opposite to the third direction.

31. The apparatus according to claim 30, wherein the first direction and the third direction are the same and the second direction and the fourth direction are the same.

32. The apparatus according to claim 30, wherein the first electrical signal is the complement of the third electrical signal, and the second and fourth electrical signals are complementary.

33. The apparatus according to claim 30, wherein the first electrical signal corresponds to the first electrical input signal multiplied by a weighting factor of $\alpha$ and the third electrical signal corresponds to the first electrical input signal multiplied by a weighing factor of $1-\alpha$, where $0 \leq |\alpha| \leq 1$; and
   the second electrical signal corresponds to the second electrical input signal multiplied by a weighting factor of $\beta$ and the fourth electrical signal corresponds to the second electrical input signal multiplied by a weighting factor of $1-\beta$, where $0 \leq |\beta| \leq 1$.

34. The apparatus according to claim 30, wherein the first electrical signal corresponds to the third electrical input signal multiplied by a weighting factor of $\alpha$ and the third electrical signal corresponds to the third electrical input signal multiplied by a weighing factor of $1-\alpha$, where $0 \leq |\alpha| \leq 1$; and
   the second electrical signal corresponds to the fourth electrical input signal multiplied by a weighting factor of $\beta$ and the fourth electrical signal corresponds to the fourth electrical input signal multiplied by a weighting factor of $1-\beta$, where $0 \leq |\beta| \leq 1$.

35. The apparatus of claim 30, further comprising:
   a first electrical circulator coupled to the first end of the electrode;
   a second electrical circulator coupled to the second end of the electrode;
   a third electrical circulator coupled to the first end of the other electrode; and
   a fourth electrical circulator coupled to the second end of the other electrode.

36. The apparatus of claim 35, further comprising:
   first and second terminating resistors coupled to the first and second electrical circulators; and third and fourth terminating resistors coupled to the third and fourth electrical circulators.

37. A modulator apparatus for modulation of three optical input signals with first, second, third, fourth, fifth and sixth electrical input signals comprising:

a first modulator having a first electrode receiving the first electrical input signal, a second electrode receiving the second electrical input signal, a first optical signal path co-propagating the first optical input signal with the first electrical input signal and counter-propagating the second optical input signal to generate a first modulated optical signal, and a second optical signal path co-propagating the second optical input signal with the second electrical input signal and counter-propagating the first optical input signal to generate a second modulated optical signal;

a second modulator having a third electrode receiving the third electrical input signal, a fourth electrode receiving the fourth electrical input signal, a third optical signal path co-propagating the third optical input signal with the third electrical input signal and counter-propagating the second optical input signal to generate a third modulated optical signal, and a fourth optical signal path co-propagating the second optical input signal with the fourth electrical input signal and counter-propagating the third optical input signal to generate a fourth modulated optical signal; and a third modulator includes a fifth electrode receiving the fifth electrical input signal, a sixth electrode receiving the sixth electrical input signal, a fifth optical signal path co-propagating the third optical input signal with the fifth electrical input signal and counter-propagating the first optical input signal to generate a fifth modulated optical signal, and a sixth optical signal path co-propagating the first optical input signal with the sixth electrical input signal and counter-propagating the third optical input signal to generate a sixth modulated optical signal.

38. The apparatus according to claim 37, further comprising:

a first laser, coupled to the first and sixth optical signal paths, for generating the first optical signal;

a second laser, coupled to the second and fourth optical signal paths, for generating the second optical signal; and a third laser, coupled to the third and fifth optical signal paths, for generating the third optical signal.

39. The apparatus according to claim 38, further comprising:

a first optical circulator between the first laser and the first optical signal path for providing optical isolation between the first laser and the second modulated optical signal;

a second optical circulator between the second laser and the second optical signal path for providing optical isolation between the second laser signal and the first modulated optical signal;

a third optical circulator between the third laser and the third optical signal path for providing optical isolation between the third laser and the fourth modulated optical signal;

a fourth optical circulator between the second laser and the fourth optical signal paths for providing optical isolation between the second laser and the third modulated optical signal;

a fifth optical circulator between the third laser and the fifth optical signal paths for providing optical isolation between the third laser and the sixth modulated optical signal; and a sixth optical circulator between the first laser and the sixth optical signal path for providing optical isolation between the first laser and the fifth modulated optical signal.

40. The apparatus according to claim 38, further comprising:

a first wavelength division multiplexer between the first laser and the first optical signal path for providing optical isolation between the first laser and the second modulated optical signal;

a second wavelength division multiplexer between the second laser and the second optical signal path for providing optical isolation between the second laser signal and the first modulated optical signal;

a third wavelength division multiplexer between the third laser and the third optical signal path for providing optical isolation between the third laser and the fourth modulated optical signal;

a fourth wavelength division multiplexer between the second laser and the fourth optical signal paths for providing optical isolation between the second laser and the third modulated optical signal;

a fifth wavelength division multiplexer between the third laser and the fifth optical signal paths for providing optical isolation between the third laser and the sixth modulated optical signal; and a sixth wavelength division multiplexer between the first laser and the sixth optical signal path for providing optical isolation between the first laser and the fifth modulated optical signal.

41. The apparatus according to claim 37, further comprising:

a first and third electrical circulators respectively coupled to the first and third electrodes;

second and fourth electrical circulators respectively coupled to the second and fourth electrodes;

fifth and sixth electrical circulators respectively coupled to the fifth and sixth electrodes; and wherein the first and second electrical circulators provide electrical isolation for the first and second electrical input signals, the third and fourth electrical circulators provide electrical isolation for the third and fourth electrical input signals and the fifth and sixth electrical circulators provide electrical isolation for the fifth and sixth electrical input signals.

42. The apparatus according to claim 41, further comprising a terminating resistor coupled to each of the first, second, third, fourth, fifth and sixth electrical circulators.

43. The apparatus according to claim 37, further comprising:

a first and third electrical isolators respectively coupled to the first and third electrodes;

second and fourth electrical isolators respectively coupled to the second and fourth electrodes;

fifth and sixth electrical isolators respectively coupled to the fifth and sixth electrodes; and wherein the first and second electrical isolators provide electrical isolation for the first and second electrical input signals, the third and fourth electrical isolators provide electrical isolation for the third and fourth electrical input signals and the fifth and sixth electrical isolators provide electrical isolation for the fifth and sixth electrical input signals.

44. The apparatus according to claim 37, wherein the first, second, third, fourth, fifth and sixth electrical input signals have frequencies above 2 GHz.

45. The apparatus according to claim 37, wherein each of the first, second and third optical signals are generated by separate continuous wave mode lasers.

46. The apparatus according to claim 37, wherein said modulators are Mach-Zehnder interferometer-type modulators.

47. The apparatus according to claim 37, wherein at least one of said first, second and third modulators comprise:
an electrode receiving an electrical input signal;
another electrode receiving another electrical input signal;
a terminating resistor coupled to an end of the electrode; and
another terminating resistor coupled to an end of the other electrode, wherein the terminating resistors are disposed diagonally to each other on the modulator.

48. The apparatus according to claim 37, wherein at least one of said first, second and third modulators comprise:
an electrode having first and second ends, the first end receiving a first electrical signal for propagation in a first direction and the second end receiving a second electrical signal for propagation in a second direction opposite to the first direction;
another electrode substantially isolated from the electrode and having first and second ends, the first end receiving a third electrical signal for propagation in a third direction and the second end receiving a fourth electrical signal for propagation in a fourth direction opposite to the third direction.

49. The apparatus according to claim 48, wherein the first direction and the third direction are the same and the second direction and the fourth direction are the same.

50. The apparatus according to claim 48, wherein the first electrical signal is the complement of the third electrical signal, and the second electrical signal and the fourth electrical signal are complementary.

51. The apparatus according to claim 48, wherein a first electrical signal corresponds to the first electrical input signal multiplied by a weighting factor of $\alpha$ and the third electrical signal corresponds to the first electrical input signal multiplied by a weighing factor of $1-\alpha$, where $0 \leq |\alpha| \leq 1$; and the second electrical signal corresponds to the second electrical input signal multiplied by a weighting factor of $\beta$ and the fourth electrical signal corresponds to the second electrical input signal multiplied by a weighting factor of $1-\beta$, where $0 \leq |\beta| \leq 1$.

52. The apparatus according to claim 48, wherein the first electrical signal corresponds to the third electrical input signal multiplied by a weighting factor of $\alpha$ and the third electrical signal corresponds to the third electrical input signal multiplied by a weighing factor of $1-\alpha$, where $0 \leq |\alpha| \leq 1$; and the second electrical signal corresponds to the fourth electrical input signal multiplied by a weighting factor of $\beta$ and the fourth electrical signal corresponds to the fourth electrical input signal multiplied by a weighting factor of $1-\beta$, where $0 \leq |\beta| \leq 1$.

53. The apparatus according to claim 48, wherein the first electrical signal corresponds to the fifth electrical input signal multiplied by a weighting factor of $\alpha$ and the third electrical signal corresponds to the fifth electrical input signal multiplied by a weighing factor of $1-\alpha$, where $0 \leq |\alpha| \leq 1$; and the second electrical signal corresponds to the sixth electrical input signal multiplied by a weighting factor of $\beta$ and the fourth electrical signal corresponds to the sixth electrical input signal multiplied by a weighting factor of $1-\beta$, where $0 \leq |\beta| \leq 1$.

54. The apparatus of claim 48, further comprising:
a first electrical circulator coupled to the first end of the electrode;
a second electrical circulator coupled to the second end of the electrode;
a third electrical circulator coupled to the first end of the other electrode; and
a fourth electrical circulator coupled to the second end of the other electrode.

55. The apparatus of claim 54, further comprising:
first and second terminating resistors coupled to the first and second electrical circulators; and
third and fourth terminating resistors coupled to the third and fourth electrical circulators.

* * * * *